United States Patent [19]

Audras et al.

[11] Patent Number: 4,787,965
[45] Date of Patent: Nov. 29, 1988

[54] PROTECTIVE COATING FOR THE CARRIER BARS OF PREBAKED ANODES AND THE EMERGING PART OF SAID ANODES

[75] Inventors: Gabriel Audras, Lyon; Bernard Samanos, Ste Foy Les Lyon, both of France

[73] Assignees: Societe Des Electrodes; Refractaires Savoie (SERS), both of Courbevoie, France

[21] Appl. No.: 118,023

[22] Filed: Nov. 6, 1987

[30] Foreign Application Priority Data

Nov. 14, 1986 [FR] France .................................. 8616285

[51] Int. Cl.$^4$ .............................................. C25C 7/00
[52] U.S. Cl. .................................. 204/290 R; 204/294; 106/14.05; 106/104; 501/100; 501/101; 501/124
[58] Field of Search .......................... 204/290 R, 294; 501/100, 101, 124; 106/14.05, 104

[56] References Cited

U.S. PATENT DOCUMENTS 3,846,144 11/1974 Parsons et al. ........................ 501/100
4,246,035 1/1981 Maczura et al. ..................... 501/124
4,318,996 3/1982 Magder ................................. 501/84

Primary Examiner—T. Tung
Assistant Examiner—Kathryn Gorgos
Attorney, Agent, or Firm—Dennison, Meserole, Pollack & Scheiner

[57] ABSTRACT

The invention concerns a coating for providing protection from corrosion and oxidation in the hot state, which coating is intended for the carrier bars of prebaked anodes and the emergent, or exposed, carbonaceous part of said anodes for Hall-Heroult electrolysis tanks, which elements are formed of a composition of carbonaceous aggregate selected from coke, graphite, semi-graphite and electrode scrap, together with calcium aluminate cement having an alumina content which is at least equal to 70% and a total amount of troublesome impurities ($SiO_2$, $Fe_2O_3$, $TiO_2$, $K_2O$, $Cr_2O_3$ and $Mn_2O_3$) of less than 5% and preferably less than 2%. The protective coating may further comprise an addition of alumina powder in a proportion which can be up to 50% of the weight of the aggregate and an addition of 0.01% to 5% of metal powder such as passivated aluminium powder of a grain size of less than 0.1 mm. The coating may be used in the form of paste or be applied by spray gun.

10 Claims, 1 Drawing Sheet

PROTECTIVE COATING FOR THE CARRIER BARS OF PREBAKED ANODES AND THE EMERGING PART OF SAID ANODES

TECHNICAL FIELD OF THE INVENTION

The invention concerns a coating for affording protection from corrosion and hot oxidation, which is intended for the carrier bars of prebaked anodes and for the emerging carbonaceous part of such anodes which are used in tanks for the production of aluminium by the electrolysis of alumina dissolved in molten cryolite, using the Hall-Heroult process.

STATE OF THE ART

Most modern tanks for electrolytic production using the Hall-Heroult process use carbonaceous anodes which are referred to as being "prebaked" being produced by shaping at a temperature of about 120 to 160° C., a carbonaceous paste essentially formed by coke (and/or anthracite) and pitch, and then baking for around one hundred hours at 1150°/1200° C.

Figure 1:
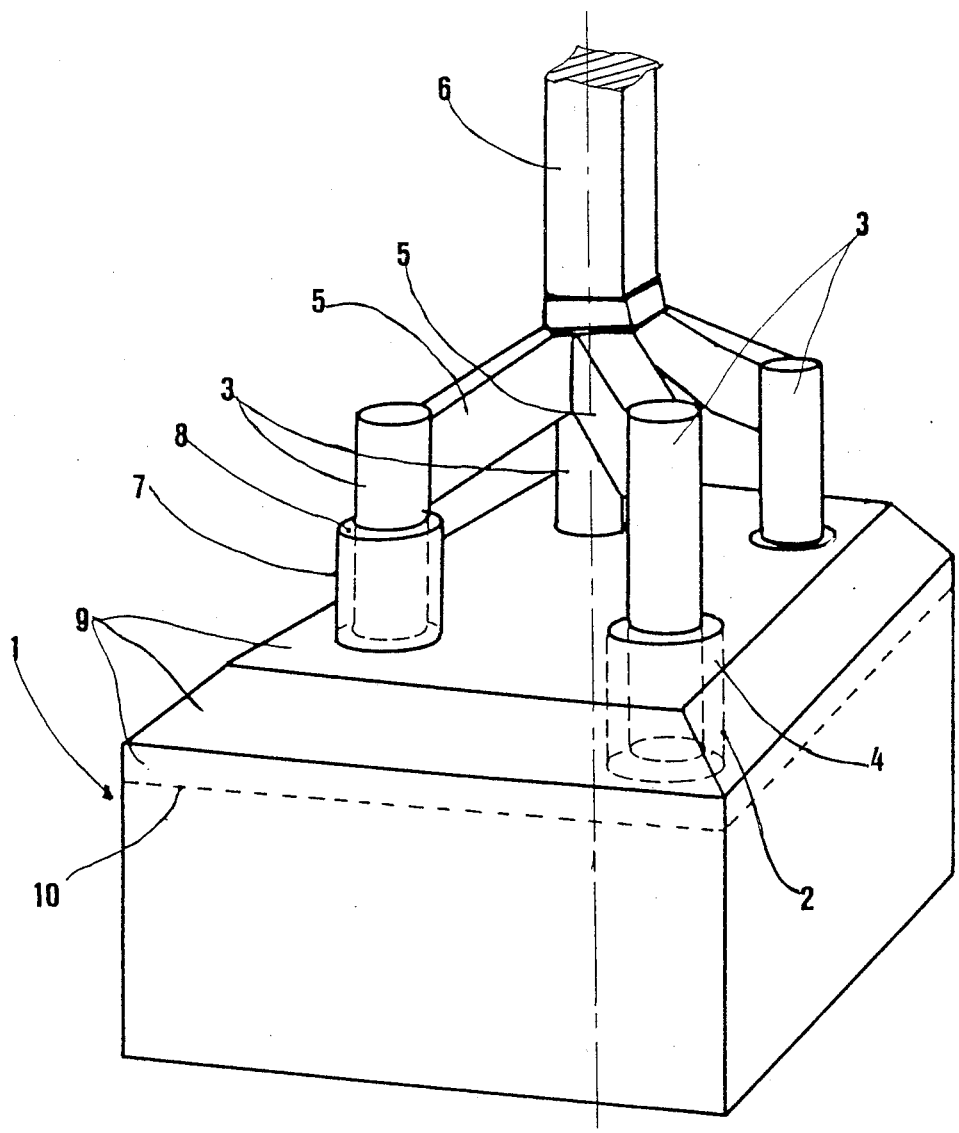
FIG. 1 shows the general structure of an anode referred to as prebaked anode of the conventional type having four carrier bars.

In the operation of shaping the paste, a certain number of cavities 2 which are often referred to as "anode plugs" are provided in the upper part of the anode 1. Carrier bars 3 (or steel plates) will be introduced into and sealed in the cavities 2, with the carrier bars or plates serving both to suspend the anode from the anodic frame structure and to supply it with current. The sealing effect is produced by casting cast iron as indicated at 4 or more rarely by means of a carbonaceous paste of special composition.

The steel bars 3 are subjected both to an elevated temperature and to the corrosive action of the fluorine-bearing effluents which are emitted by the tank in operation thereof. Furthermore, in certain operations, for example upon a downward movement of anodes which is intended to bring an end to an "anodic effect", or when there are "waves" in the electrolyte, molten cryolite bath may come into contact with the base of the steel bars.

Those various phenomena cause the proportion of iron in the aluminium produced in the tank to be substantially increased by virtue of base corrosion of the carrier bars. That corrosion also has the harmful effect of reducing the service life of the anodes suspension assembly (carrier bars+connecting bar members 5 between the carrier bars 3 and the anode stem 6) which are normally recovered and re-used after extraction of the worn-out anodes from the tank.

Likewise, the emerging part of the anodes, that is to say the upper part 9 which, in normal operation of the electrolysis tank, is not immersed in the molten electrolyte, suffers from degradation due to combustion, which is sought to be prevented by a covering of solidified and crushed electroylsis bath which is optionally mixed with alumina, or else by a metallisation produced by spraying liquid aluminium by means of a gun.

The attempt has also been made to protect the base of the carrier bars 3 by means of different processes such as metallisation by spraying liquid aluminium or by fitting around the carrier bars a collar portion 7 of aluminium which leaves a space 8 of from 10 to 30 mm relative to the carrier bar (or the plate), the space being filled with a hot-cast carbonaceous paste. It has been proposed for the purpose to use conventional carbonaceous pastes (coke and/or anthracite and/or graphite+pitch) or more complex compositions comprising ploymerisable and cokable organic substances such as epoxy resins, furfuryl resins, etc. (German patent application DE-AS No. 25 47 061).

However, those hydrocarbon compositions suffer from the major disadvantage that, as soon as the anode is brought into operation, with the anode progressively reaching its equilibrium temperature, such compositions cause the production of hydrocarbon vapours originating from cracking of the carbonaceous paste. Some aromatic compounds which are formed in that manner are suspected of having harmful physiological effects, and in addition, they cause pollution of and promote obstruction of the circuits for sucking off and washing effluents on the electrolysis tanks. For all those reasons, the "collar portion pastes" which are made up solely of carbonaceous substances no longer satisfy the operators of electroylsis tanks which use prebaked anodes. Now, the present day trend is precisely to produce a primary aluminium which is in as high a state of purity as possible, in the electrolysis tanks. Corrosion of the base of the carrier bars being one of the sources of iron in the aluminium produced, it was therefore important to find a way of affording effective protection and which preferably is also applied to the emergent carbonaceous part 9 of the anodes.

SUBJECT OF THE INVENTION

The subject of the invention is a collar portion paste composition which does not suffer from the disadvantages of carbonaceous pastes and which provides for effective protection for the base of the steel carrier bars and optionally the emergent carbonaceous part 9 of the anodes (which is approximately delimited by the broken line 10) throughout the service life of the anodes (that is to say around twenty days on average). That composition is essentially characterised by a carbonaceous aggragate such as coke, artificial graphite, scrap from anodes or electrodes of semi-graphic with a low ash content (preferably <2%) which is bound by a calcium aluminate cement, with a low proportion of troublesome impurities ($SiO_2$, $Fe_2O_3$, $TiO_2$, $K_2O$, $Cr_2O_3$, with the total content preferably being lower than 1%), having an alumina content which is at least equal to 70% and preferably at least equal to 80%, the whole being bound by the addition of water.

The above-indicated impurities are referred to as troublesome as, when introduced into the electrolysis bath, they are reduced and the corresponding metals Si, Fe, Ti, Cr, Mn and K mix with the liquid aluminium.

A complementary addition of an anti-oxidant such as a metal powder in a proportion of from 0.01 to 5% by weight, for example passivated aluminium in grain for <0.1 mm, substantially enhances the resistance to oxidation.

It is also possible to add alumina to the paste, for example alumina for electrolysis or spherical alumina, in a proportion which may constitute up to 50% of the total weight of the aggregate.

The proportion by weight of cement, expressed as a percentage by weight of the aggregate (carbonaceous substance+alumina+additives) is between 10 and 60% and preferably from 15 to 50%. The term "dry matter"

will be used to designate the whole of the aggregate (carbonaceous substance, alumina, additives) and the cement.

To protect the emergent part 9 of the anode, the same compositions are suitable, but it is then preferable for them to be applied by gun spraying. For that purpose, depending on the type of gun used, it is necessary to control the granulometry of the aggregate and the cement (less than 1 mm and preferably less than 0.5 mm) and substantially increase the amount of water.

The amount of water used will be fixed for example at between 10 and 40% by weight with respect to the dry matter (as defined above) for use in the form of a collar portion paste and up to 60% by weight for use in the form of a fluid paste to be sprayed with a gun.

DESCRIPTION OF THE INVENTION

The petroleum coke which is used in the composition of the collar portion paste according to the invention is preferably of the "current" quality used for the production of anodes.

Its usual means composition is as follows:

| Ashes (reckoned as oxides) | 0.4% | |
|---|---|---|
| Impurities (reckoned as metal) | | |
| silicon | 0.056% | |
| iron | 0.045% | |
| manganese | 0.001% | 0.124% |
| vanadium | 0.012% | |
| zinc | 0.010% | |

The artificial graphite prepared from that coke has an ash content <0.1%.

It is also possible to use semi-graphite electrode scrap in which the proportion of ash is less than 5%.

Calcium aluminate cement: two particularly favourable compositions are those which corresond to the products "SECAR 80" and "SECAR 71" from LAFARGE FONDU INTERNATIONAL, the composition of which is set out in the following Table:

| | SECAR 80 | | SECAR 71 | |
|---|---|---|---|---|
| $Al_2O_3$ | 80.5% | 98.5% | 71% | 98% |
| CaO | 18.0% | | 27% | |
| $SiO_2$ | 0.20% | | 0.35% | |
| $Fe_2O_3$ | 0.15% | | 0.25% | |
| $TiO_2$ | 0.03% | 0.43% | 0.05% | 0.72% |
| $K_2O$ | 0.03% | | 0.05% | |
| $Cr_2O_3$ | 0.01% | | 0.01% | |
| $Mn_2O_3$ | 0.01% | | 0.01% | |
| MgO | 0.1% | | 0.2% | |
| $Na_2O$ | 0.25% | | 0.35% | |
| $SO_3$ | 0.1% | | 0.15% | |
| $P_2O_5$ | traces | | — | |

Furthermore, the addition of metal powder substantially enhances the resistance to oxidation, as has been indicated above.

Finally, it is possible to provide for a supplementary addition of alumina powder, being electrolysis alumina or spherical alumina type, representing up to 50% by weight of the aggregate.

The mixture of carbonaceous charge+cement +metal powder +alumina powder if provided is prepared in a mixer after the addition of the necessary amount of water which may be between 10 and 40% by weight with respect to the total weight of aggregate+cement+additive in the case of a collar portion paste and up to 60% in the case of a fluid paste which is to be sprayed. The paste produced is poured into the collar portion 7 and then compacted or vibrated to give the desired level of compactness or sprayed by means of a gun, depending on circumstances.

When an anode whose upper carbonaceous part is covered with a protective coating and provided with its protective collar portions in accordance with the invention is set in position in the tank, the rise in temperature in the upper part of the anode is sufficiently slow for drying and baking of the protective paste in the collar portions and the sprayed coating to take place without cracking.

EMBODIMENTS

Set out in Table 1 below are the mean results of a first series of tests carried out using eight paste compositions according to the invention. The oxidation test comprises measuring the loss in weight over 1 hour at 550° C. in a flow of air, on a sample of paste.

It is found that the loss in weight varies from 9 to 25% depending on the formulation used, the best results being obtained with compositions Nos. 1 and 5, No. 5 with 10% of alumina powder giving the best results (amount of oxidation <9%).

A second test was carried out, using a paste formulation for spraying by means of a gun, being intended to protect the emergent part of a prebaked anode.

The fluid paste was of the following composition:

| petroleum coke | 20% |
|---|---|
| (ungraded powder, 0.5 mm) | |
| alumina powder | 45% |
| cement "SECAR" | 35% |
| water, in % of the total of dry matters | 64.6% |
| (coke + alumina + cement) | |

The samples have been fired during 30 mn, at about 1000° C. under a stream of nitrogen.

The samples when coated in that way were subjected to an oxidation test at 1000° C. in a stream of carbon dioxide gas (50 liters per hour during 24 h.), the loss in weight expressed in $mg.cm^{-2}.h^{-1}$ was of 5.5%.

On non-coated reference samples, the loss in weight under the same conditions was of 8.2%.

The relative gain is of about 33%.

| Composition in % by weight | 1 | 2 | 3 | 4 | 5 | 6 | 7 | 8 |
|---|---|---|---|---|---|---|---|---|
| AGGREGATE: | | | | | | | | |
| Petroleum coke | | | | | | | | |
| R8 | 45 | | | | | 23.5 | | 26 |
| 8/100 mesh | 45 | 90 | 100 | | | 59 | 50 | 26 |
| Petroleum coke powder | | | | | | | 50 | |
| Graphite 0.5/1.5 | | | | 50 | 45 | | | |

-continued

| Composition in % by weight | 1 | 2 | 3 | 4 | 5 | 6 | 7 | 8 |
|---|---|---|---|---|---|---|---|---|
| Graphite powder | | | | 50 | 45 | | | |
| Alumina powder | 10 | 10 | | | 10 | 17.5 | | 48 |
| CEMENT (in % of the total aggregate) | 25 | 25 | 45 | 45 | 25 | 17.6 | 20 | 30 |
| Oxidation test (%) | −9.6 | −19.9 | −21.5 | −9.16 | −8.81 | −15.4 | −24.9 | −12 |
| Water in % (of the dry matter) | 12.5 | 6.0 | 20.0 | 29.0 | 25.0 | 26.0 | 32.0 | 20 |

R8 denotes: refusal at a sieve with 8 meshes to the inch (mesh opening about 2.4 mm)
8/100 means: fraction between the sieves with 8 and 100 meshes to the inch.

Use of the invention makes it possible to provide for effective protection of the base of the carrier bars of anodes and the emergent part of the anode from corrosion and oxidation throughout the service life of the anode. In addition, it does not in any way interfere with recovery of the elements of the worn-out anodes: (electrolysis bath crust, carbon stamp ends, sealing cast iron and suspension bars) which are recycled after suitable treatment.

It will be appreciated that the invention can be carried into effect independently on the carrier bars and/or on the emergent carbonaceous part of the anode. In addition, producing the coating by spraying with a gun may also be effected on the carrier bars, as a replacement for the paste on the collar portions, if the operator considers it to be sufficiently effective according to his requirements.

We claim:

1. A carbonaceous prebaked anode for the production of aluminum of high purity by the Hall-Heroult process, comprising a carrier iron bar, wherein at least a portion of said anode and a portion of said bar are coated with a composition consisting essentially of:
    carbonaceous aggregate selected from the group consisting of coke, graphite, semigraphite and electrode scrap;
    calcium aluminate cement having an alumina content of at least 70% by weight, and having a total content of impurities $SiO_2$, $Fe_2O_3$, $TiO_2$, $K_2O$, $Cr_2O_3$, and $Mn_2O_3$ of less than 5% by weight;
    0 to 5% by weight of an anti-oxidant aluminum powder aggregate; and
    alumina powder aggregate in an amount of 0 to 50% of the weight of total aggregate.

2. A coating composition for protecting from corrosion and oxidation in the hot condition carrier bars of prebaked anodes and the emergent carbonaceous part of said anodes for Hall-Heroult electrolysis tanks, consisting essentially of:
    carbonaceous aggregrate selected from the group consisting of coke, graphite, semigraphite and electrode scrap;
    calcium aluminate cement having an alumina content of at least 70% by weight, and having a total content of impurities $SiO_2$, $Fe_2O_3$, $TiO_2$, $K_2O$, $Cr_2O_3$, and $Mn_2O_3$ of less than 5% by weight;
    0 to 5% by weight of an anti-oxidant aluminum powder aggregate; and
    alumina powder aggregate in an amount of 0 to 50% of the weight of total aggregate.

3. A composition according to claim 2 characterised in that the contents of said impurities is less than 2% by weight.

4. A composition according to claim 2 characterised in that the aggregate further comprises an addition of alumina powder in a proportion of up to 50% of the weight of the aggregate.

5. A composition according to claim 2 or claim 3 or claim 4 characterised in that the carbonaceous aggregate has an ash content of less than 5%.

6. A composition according to claim 2 or claim 3 or claim 4 characterised in that said aluminum powder comprises passivated aluminum powder of smaller grain size than 0.1 mm in an amount of 0.01 to 5% by weight.

7. A composition according to claim 2 or claim 3 or claim 4 characterised in that the cement content by weight is between 10 and 60% with respect to the weight of the aggregate.

8. A composition according to claim 2 or claim 3 or claim 4 characterised in that the cement content by weight is between 15 and 50% of the aggregate.

9. A composition according to claim 2 or claim 3 or claim 4 characterised in that the composition has a content of water by weight which is between 10 and 40% of the weight of the dry matter for use in the form of collar portion paste and up to 60% by weight content of water for use by spraying with a gun.

10. A method of protecting carrier bars of prebaked anodes and the emergent carbonaceous part of such anodes from oxidation in a hot condition in use in a Hall-Heroult electrolysis tank, which comprises applying a coating composition of claim 2 or claim 3 or claim 4 to said carrier bars and the emergent carbonaceous part of such anodes.

* * * * *